UNITED STATES PATENT OFFICE.

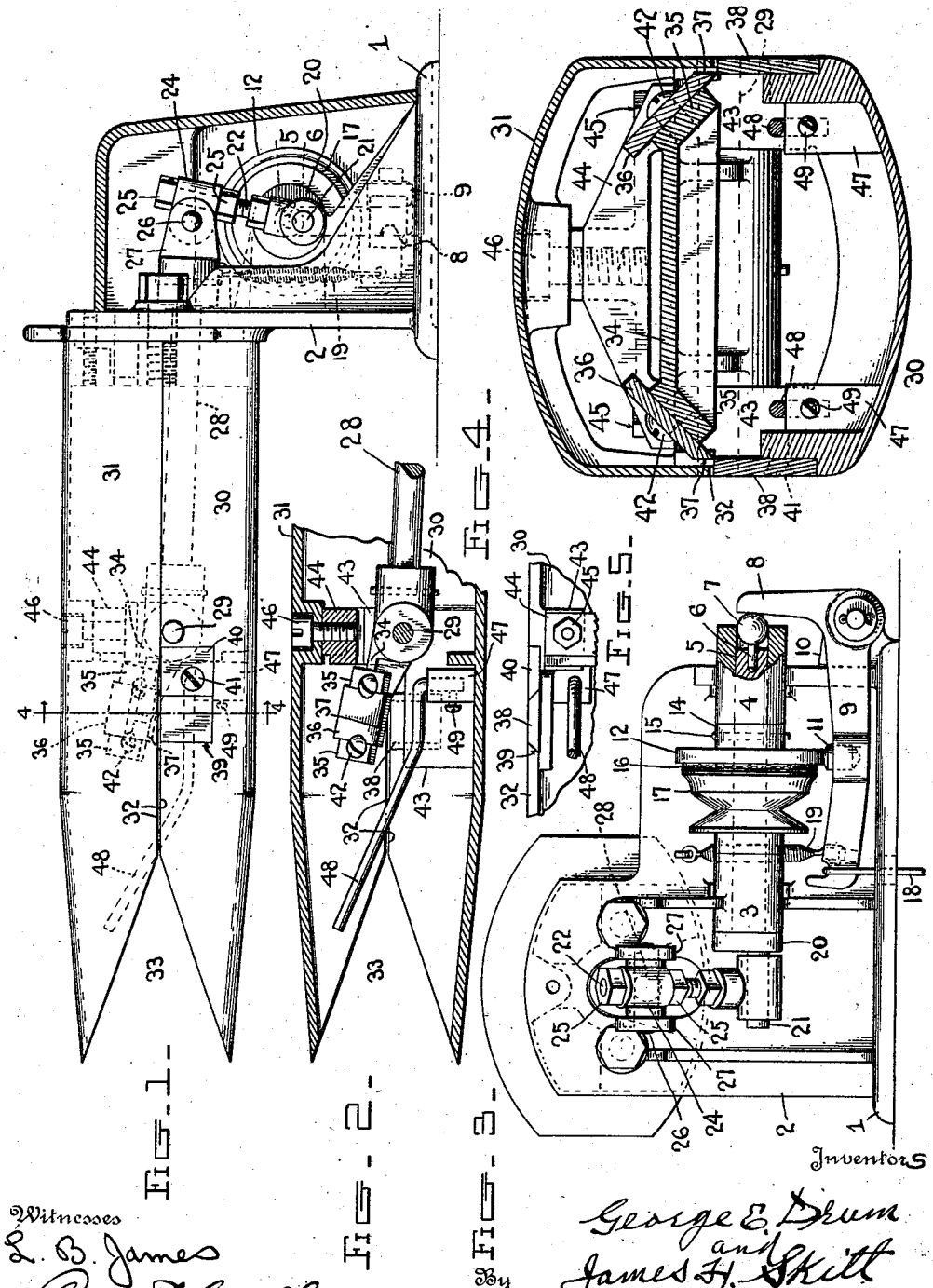

GEORGE E. DRUM AND JAMES H. SKITT, OF PHILADELPHIA, PENNSYLVANIA, ASSIGNORS TO ROBERT P. SMITH AND GEORGE E. DRUM, OF PHILADELPHIA, PENNSYLVANIA, COPARTNERS TRADING AS SMITH, DRUM & COMPANY.

THREAD-CUTTING MACHINE.

1,185,296.    Specification of Letters Patent.    Patented May 30, 1916.

Application filed August 15, 1914. Serial No. 856,910.

*To all whom it may concern:*

Be it known that we, GEORGE E. DRUM, a citizen of the United States, and JAMES H. SKITT, a subject of the King of England, residing at Philadelphia, in the county of Philadelphia and State of Pennsylvania, have invented certain new and useful Improvements in Thread-Cutting Machines, of which the following is a specification.

The object of the invention is to improve the construction of floating thread cutters such as are employed in connection with the manufacture of stockings with double soles.

The invention is more fully described in the following specification and clearly illustrated in the accompanying drawing, in which:

Figure 1 is a view in side elevation of the invention, parts being illustrated in section, Fig. 2 is a view in vertical section through a portion of Fig. 1, Fig. 3 is a view in elevation of one end of Fig. 1, the housing plate being removed, Fig. 4 is a verticle sectional view through Fig. 1 on the line 4—4, and Fig. 5 is a top plan view of a fragment of the lower section of the tube.

In the drawing, reference character 1 designates the base, upwardly from which extends a bracket plate 2 which is equipped with spaced horizontally alined bearings 3 and 4 in which is journaled a shaft 5 provided in one end with a small plug 6 against which bears a ball 7, the ball being confined in the outer end of the bearing 4 by the toe 8 of a bell crank lever 9. This lever 9 is pivoted at its elbow to a bracket bearing 10 in the nature of an extension from said base 1 and plate 2. The lever 9, midway its horizontal portion is provided with a brake shoe 11 which is adapted to engage the rim 12 of a clutch member whose hub 14 is fixed to the shaft 5 for rotation therewith by means of a taper pin 15. The inner face of the clutch member is provided with a leather or friction facing 16 which is adapted to interlock the clutch member with a grooved belt pulley 17, the latter being loose on the said shaft 5. To the free end of the horizontal portion of the lever 9 is attached an operating rod 18 which may be connected to a treadle or other manually actuated device, not shown. When the operator desires to set the shaft 5 in operation, he pulls down on the free end of the lever 9 thereby removing the brake shoe 11 from the rim 12 of the clutch member and at the same time causing the toe 8 of said lever to press the ball and thereby slightly move the shaft 5 inwardly endwise. As the shaft 5 thus moves, the clutch member is correspondingly moved so that its leather facing 16 frictionally engages with the free pulley 17 causing power to be transmitted from said pulley to the shaft. When pressure is released on rod 18, a spring 19 attached to the lever 9 and the back plate 2 raises the free end of the lever 9 and brings the brake shoe 11 against the rim 12 of the clutch member, thereby stopping rotation thereof and of the shaft 5. It will be understood that the space between the leather facing 16 and the pulley 17 is very slight so as to require an almost negligible endwise movement of the shaft 5 to effect rotation thereof. The ball 7 compensates for the wear between the nonrotating toe portion 8 and the rotating shaft 5, and the thrust of the pulley 17 when engaged by the leather clutch facing 16 is against the inner end of the bearing 3.

The end of the shaft 5 adjacent the bearing 3 is provided with a collar 20 and a crank pin 21 to which is journaled a pitman 22 which passes through a block 24 and is adjustable therein by means of nuts 25 threaded on said pitman 22. Through the block 24 passes a pin 26 which is journaled in the forked end 27 of a main operating lever 28, the latter being pivoted at 29 in the lower section 30 of the stocking tube, the upper section of said tube being designated by numeral 31. These two sections when secured together and to the back plate 2 in any suitable manner, produce the stocking tube over which the stocking or sock having the floating threads to be cut are placed. The adjacent edges 32 of the tube sections 30, 31 beyond the pivotal point 29 are spaced apart and toward the free ends of these sections the space so formed gradually increases into a throat 33. The lever 28 beyond its pivot 29 is provided with a plate 34 having oppositely beveled side faces 35 which converge upwardly toward each other, and to whose faces 35 are attached correspondingly inclined cutters 36 having beveled cutting edges 37, vertically disposed. In opposite side walls of the tube section 30 are arranged shear blocks 38, having their opposite side edges beveled outwardly toward each other. These blocks 38 are slipped into correspondingly shaped pockets 39 in the tube section 30 and are secured in place by blocks 40 held by screws 41. The cutters 36 are held by the heads of screws 42 overlapping them and inserted in the beveled plates 35, by loosening said screws the cutters may be adjusted along the beveled plates 35 toward and from the shear blocks 38. It will be observed that the tube section 30 on opposite sides has blocks 43 projecting upwardly above the edge 32 and upon the same rests a bridge plate 44 secured thereto by bolts 45, and to this bridge 44, the upper tube section 31 is secured by a bolt 46. The lower portions of the blocks 43, as indicated by numerals 47, receive downwardly bent ends of spring tension rods 48, which ends are secured by set screws 49. From these blocks 47, said rods extend horizontally or parallel with the tube section 30 forwardly from the pivotal point 29 and below the plane of the space between the said edges 32, and thence project upwardly at an angle toward the upper tube section 31, intersecting the space between the edges 32 at a point substantially where the throat portion 33 begins.

In operation, the stocking, sock, or other tubular knit structure having the floating threads, is placed over the tubular sections 30, 31 so that the floating threads enter the throat 33 and enter the space between the edges 32. As the floating threads are passed along said space, they encounter the tension rods 48 and are drawn downwardly so as to pull the stocking or other structure close up against the edges 32. As the stocking or other structure is drawn over the tube, the shaft 5 is set into operation in the manner already described, and through the operation of the shaft, the lever 28 is caused to oscillate on its pivot 29 causing similar oscillation of the cutters 36 against the shear blocks 38, and as the float threads are drawn tightly over the inner edges or corners of these blocks 38, they are severed by the action of the cutters 36. After shearing, the operation of the cutters may be discontinued by the operator releasing the rod 18 and causing the brake 11 to be applied as the clutch member is released from the pulley 17. By removing the upper tube section 31, the loose clippings that accumulate under the knives and tension rods and if permitted would clog the mechanism, may be readily removed, also the tension rods and knives by such removal of the tube section 31 may be readily adjusted and the knives taken out for resharpening.

What is claimed:

1. In a device of the type described, a substantially longitudinally slotted tubular member, shearing means associated with the slotted portion thereof, and a tension member mounted in said tubular member and having its free end directed toward the end of said tubular member from which the goods are applied and said tension member intersecting the plane of the slotted portion of the tube and being adjustable in a direction at right angles to the slotted portion.

2. In a device of the type described, a slotted tubular member, shearing mechanism associated with the slotted portion thereof, and a tension member mounted in said tubular member and having its free end directed toward the end of said tubular member from which the goods are applied and said tension member intersecting the plane of the slotted portion of the tube and with its mounting serving to prevent the clippings from clogging the shearing mechanism.

3. In a device of the type described, a tubular member composed of sections mated to provide longitudinal slots in said tubular member between the sections and one of said sections being removable from the other, a cutting member mounted on said other section and forming a shearing device therewith.

4. In a device of the type described, a tubular member composed of two separable sections mated to present longitudinal slots between them, a shearing member mounted entirely on one of said sections and co-acting therewith to form a cutting device, and a tension member mounted on the same section as the shearing member and having its free end directed toward the end of said tubular member from which the goods are applied and intersecting the plane of the slots and being adjustable toward the other section.

5. In a device of the type described, a longitudinally slotted tubular member, shearing means associated with the slotted portion thereof, a tension member having a portion parallel with said slotted portion of the tubular member and also an angularly disposed free end portion directed away from the cutter and intersecting the plane of the slotted portion of the tubular member, the parallel portion being adjustable toward and from the slotted portion of the tubular member.

6. In a device of the type described, a tubular member longitudinally slotted on opposite sides, a transverse shaft in said tubular member, a lever pivoted between its ends on said shaft, operating means at the rear end of said lever, and cutters on opposite sides of the forward end of said lever adapted to travel across the plane of said slots and co-acting with edges of the slot to produce shearing means.

7. In a device of the type described, a tubular member longitudinally slotted on opposite sides, a lever pivotally mounted within said tubular member and having inclined portions adjacent said slots, knives slidably adjustable on said inclined portions and being movable toward and from the edges of the slots to co-act therewith to produce shearing means.

8. In a device of the type described, a tubular member comprising two sections mated to provide longitudinal slots therebetween, one of the sections being removable, cutter plates slidable in the other section at right angles to its slot-edges, a cutter member mounted in said other section and adapted to shear with the cutter plates thereof, and a tension member mounted on said other section in a manner to prevent the clippings from clogging said movable cutter member, said tension member having a portion parallel with the slot-edges of said other section and adjustable toward the same and the free end of the tension member being directed away from the cutter and toward the removable section.

In testimony whereof we affix our signatures in presence of two witnesses.

GEORGE E. DRUM.
JAMES H. SKITT.

Witnesses:
F. M. BROWER,
R. M. DUFFY.